(12) United States Patent
Lin et al.

(10) Patent No.: US 12,349,149 B2
(45) Date of Patent: Jul. 1, 2025

(54) INFORMATION RECEIVING METHOD, INFORMATION SENDING METHOD, INFORMATION RECEIVING APPARATUS, INFORMATION SENDING APPARATUS, AND DEVICE

(71) Applicant: GUANGDONG OPPO MOBILE TELECOMMUNICATIONS CORP., LTD., Dongguan (CN)

(72) Inventors: Yanan Lin, Dongguan (CN); Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 502 days.

(21) Appl. No.: 17/553,032

(22) Filed: Dec. 16, 2021

(65) Prior Publication Data
US 2022/0110150 A1  Apr. 7, 2022

Related U.S. Application Data (63) Continuation of application No. PCT/CN2020/074474, filed on Feb. 7, 2020.

(51) Int. Cl.
*H04W 72/23* (2023.01)
*H04L 1/1812* (2023.01)

(52) U.S. Cl.
CPC .......... *H04W 72/23* (2023.01); *H04L 1/1812* (2013.01)

(58) Field of Classification Search
CPC ..................... H04W 72/23; H04L 1/1812
(Continued)

(56) References Cited

U.S. PATENT DOCUMENTS

2019/0149365 A1* 5/2019 Chatterjee .......... H04L 25/0226
370/329
2019/0342041 A1  11/2019 Medles et al.
(Continued)

FOREIGN PATENT DOCUMENTS

CN         110035542 A      7/2019
CN         110166180 A      8/2019
(Continued)

OTHER PUBLICATIONS

Second Office Action issued in European Application No. 20917414. 3, dated Jul. 21, 2023.
(Continued)

*Primary Examiner* — Duc C Ho
(74) *Attorney, Agent, or Firm* — Sheppard, Mullin, Richter & Hampton LLP (57) ABSTRACT

Disclosed are an information receiving method, an information sending method, an information receiving apparatus, an information sending apparatus, and a device. The method comprises: receiving first downlink control information (DCI), wherein the first DCI uses a first DCI format which comprises a first information domain; the first information domain is used for indicating a time unit for sending feedback information; the first DCI is used for instructing a terminal device to send the feedback information corresponding to at least one downlink channel; an indication result of the first information domain is an applicable value; the at least one downlink channel comprises a target downlink channel; the target downlink channel is not related to the first DCI; and when the first DCI format is used for scheduling downlink channel transmission or indicating semi-static resource release, the value range of the indication result of first information domain comprises an inapplicable value.

12 Claims, 3 Drawing Sheets

(58) Field of Classification Search
USPC .......................................................... 370/329
See application file for complete search history.

(56) References Cited

U.S. PATENT DOCUMENTS

| 2020/0044791 | A1 | 2/2020 | Tsai et al. | |
|---|---|---|---|---|
| 2020/0213981 | A1* | 7/2020 | Park | H04W 72/23 |
| 2020/0259896 | A1* | 8/2020 | Sachs | H04L 67/60 |

FOREIGN PATENT DOCUMENTS

| CN | 110166186 A | 8/2019 | |
|---|---|---|---|
| WO | WO 2019160483 A1 | 8/2019 | |
| WO | WO-2019184943 A1 * | 10/2019 | ........... H04L 1/1607 |

OTHER PUBLICATIONS

Second Office Action issued in Chinese Patent Application No. 202111172113.6, dated May 12, 2023.
Decision of Rejection issued in Chinese Patent Application No. 202111172113.6, dated Jul. 8, 2023.
Examination Report for European Application No. 20917414.3, dated Jan. 31, 2023.
First Office Action issued in Canada Patent Application No. 202111172113.6, dated Jan. 19, 2023.
International Search Report of PCT/CN2020/074474, mailed from China National Intellectual Property Administration on Nov. 10, 2020.
Panasonic, "HARQ enhancement for NR-U," R1-1910840, 3GPP TSG RAN WG1 #98bis, Chongqing, China, Oct. 14-20, 2019.
Nokia, Nokia Shanghai Bell, "Remaining details on NR-U HARQ scheduling and feedback," R1-1912261, 3GPP TSG RAN WG1 #99, Reno, USA, Nov. 18-22, 2019.
ITRI, "Remaining issues of HARQ enhancements for NR-U," R1-1912858, 3GPP TSG RAN WG1 #99, Reno, USA, Nov. 18-22, 2019.
Huawei, "Feature lead summary#3 of HARQ enhancements for NR-U," R1-1913561, 3GPP TSG RAN WG1 Meeting #99, Reno, USA, Nov. 18-22, 2019.
Extended European Search Report of European Application No. 20917414.3, dated May 30, 2022.
First Office Action and Notice of Reasons for Refusal issued in Japanese Patent Application No. 2021-577843, dated Sep. 29, 2023.
EP Examination Report issued in European Application No. 20917414.3, dated Dec. 19, 2023.
First Examination Report issued in Indian Patent Application No. 202127054852, dated Sep. 16, 2022.
Summons to attend oral proceedings pursuant to Rule 115(1) EPC for European Application No. 20917414.3 mailed on Jun. 12, 2024.
Xiaomi, "Discussion on HARQ enhancement for NR-U", R1-1911992, Nov. 18-22, 2019, 3GPP TSG RAN WG1 #99, Nov. 8, 2019.
Ericsson, "HARQ and scheduling enhancements for NR-U", R1-1912711, Nov. 18-22, 2019, 3GPP TSG-RAN WG1 Meeting #99, Nov. 9, 2019.
Hearing Notice dated Dec. 26, 2024 for Indian Patent Application No. 202127054852, 2 pages.
Office Action dated Apr. 22, 2025 for Korean Patent Application No. 10-2021-7042879.

* cited by examiner

Receive first Downlink Control Information (DCI), wherein the first DCI adopts a first DCI format which includes a first information field for indicating a time unit for sending feedback information, and the first DCI is used for instructing a terminal device to send feedback information corresponding to at least one downlink channel, and an indication result of the first information field is an applicable value, and the at least one downlink channel includes a target downlink channel which is irrelevant to the first DCI; wherein in a case where the first DCI format is used for scheduling downlink channel transmission or indicating semi-static resource release, a value range of the indication result of the first information field includes an inapplicable value

FIG. 2

210 — Send first Downlink Control Information (DCI), wherein the first DCI adopts a first DCI format which includes a first information field for indicating a time unit for sending feedback information, and the first DCI is used for instructing a terminal device to send feedback information corresponding to at least one downlink channel, and an indication result of the first information field is an applicable value, and the at least one downlink channel includes a target downlink channel which is irrelevant to the first DCI; wherein in a case where the first DCI format is used for scheduling downlink channel transmission or indicating semi-static resource release, a value range of the indication result of the first information field includes an inapplicable value

INFORMATION RECEIVING METHOD, INFORMATION SENDING METHOD, INFORMATION RECEIVING APPARATUS, INFORMATION SENDING APPARATUS, AND DEVICE

CROSS-REFERENCE TO RELATED APPLICATION

The present application is a continuation application of International Application No. PCT/CN2020/074474, filed on Feb. 7, 2020, the entire content of which is hereby incorporated by reference.

TECHNICAL FIELD

The present application relates to the field of communication technologies, and more particularly, to a method for receiving information, a method for sending information, an apparatus, and a device.

RELATED ARTS

When a terminal device receives a Downlink Control Information (DCI) format 1_1, the DCI triggers the terminal device to send a type-3 Hybrid Automatic Repeat request-Acknowledgement (HARQ-ACK) codebook which includes feedback information of all Hybrid Automatic Repeat request (HARQ) processes; or, the DCI triggers the terminal device to send an enhanced type-2 HARQ-ACK codebook which includes Acknowledgement (ACK)/Negative Acknowledgement (NACK) information corresponding to all Physical Downlink Shared Channels (PDSCHs) in two Physical Downlink Shared Channel (PDSCH) groups, indicating that a base station expects the terminal device to send ACK/NACK information corresponding to all scheduled PDSCHs to the base station.

However, when an indication result of a PDSCH-to-HARQ feedback timing indicator information field in the DCI is an inapplicable value, it means that a base station does not indicate an applicable time domain resource for transmission of feedback information. The indication result itself is an unreasonable scheduling indication, that is, a terminal device is required to send feedback information, but a transmission resource of the feedback information is not indicated. Therefore, there are technical problems of low system efficiency and waste of power consumption of a terminal device.

SUMMARY

The present application provides a method for receiving information, a method for sending information, an apparatus, and a device to solve technical problems of low system efficiency and waste of power consumption of a terminal device.

In a first aspect, a specific implementation of the present application provides a method for receiving information, which is applied to a terminal device, and includes: receiving a first Downlink Control Information (DCI) format which is used for indicating the terminal device to send feedback information corresponding to at least one downlink channel, wherein the first DCI format includes a first information field for indicating a time unit for sending feedback information, and an indication result of the first information field is an applicable value, and the at least one downlink channel includes a target downlink channel, which is irrelevant to the first DCI; wherein when the first DCI format is used for scheduling downlink channel transmission or indicating semi-persistent scheduling (SPS) resource release, a value range of the indication result of the first information field includes an inapplicable value.

In a second aspect, a specific implementation of the present application provides a method for sending information, which is applied to a network device, and includes: sending a first Downlink Control Information (DCI) format which is used for indicating the terminal device to send feedback information corresponding to at least one downlink channel, wherein the first DCI format includes a first information field for indicating a time unit for sending feedback information, and an indication result of the first information field is an applicable value, and the at least one downlink channel includes a target downlink channel, which is irrelevant to the first DCI; wherein when the first DCI format is used for scheduling downlink channel transmission or indicating semi-persistent scheduling (SPS) resource release, a value range of the indication result of the first information field includes an inapplicable value.

In a third aspect, a specific implementation of the present application provides an apparatus for receiving information, which is applied to a terminal device, and includes: a receiving module, configured to receive a first Downlink Control Information (DCI) format which is used for indicating the terminal device to send feedback information corresponding to at least one downlink channel, wherein the first DCI format includes a first information field for indicating a time unit for sending feedback information, and an indication result of the first information field is an applicable value, and the at least one downlink channel includes a target downlink channel, which is irrelevant to the first DCI; wherein when the first DCI format is used for scheduling downlink channel transmission or indicating semi-persistent scheduling (SPS) resource release, a value range of the indication result of the first information field includes an inapplicable value.

In a fourth aspect, a specific implementation of the present application provides an apparatus for sending information, which is applied to a network device, and includes: a sending module, configured to send a first Downlink Control Information (DCI) format which is used for indicating the terminal device to send feedback information corresponding to at least one downlink channel, wherein the first DCI format includes a first information field for indicating a time unit for sending feedback information, and an indication result of the first information field is an applicable value, and the at least one downlink channel includes a target downlink channel, which is irrelevant to the first DCI; wherein when the first DCI format is used for scheduling downlink channel transmission or indicating semi-persistent scheduling (SPS) resource release, a value range of the indication result of the first information field includes an inapplicable value.

In a fifth aspect, a specific implementation of the present application provides a terminal device, which includes a processor and a memory, wherein the memory stores a transmission program that may be run on the processor, and when the processor executes the program, any one of the above methods for receiving information is performed.

In a sixth aspect, a specific implementation of the present application provides a network device, which includes a processor and a memory, wherein the memory stores a transmission program that may be run on the processor, and when the processor executes the program, any one of the above methods for sending information is performed.

In a seventh aspect, a specific implementation of the present application provides a computer-readable storage medium in which a computer program is stored, wherein when the computer program is executed, any one of the above methods for receiving information or any one of the above methods for sending information is performed.

In an eighth aspect, a specific implementation of the present application provides a computer program product, which is stored in a non-transitory computer-readable storage medium, and when the computer program is executed, any one of the above methods for receiving information or any one of the above methods for sending information is performed.

In a ninth aspect, a specific implementation of the present application provides a chip, which includes a processor for calling and running a computer program from a memory, and a device installed with the chip performs any one of the above methods for receiving information or any one of the above methods for sending information.

In a tenth aspect, a specific implementation of the present application provides a computer program, when the computer program is executed, any one of the above methods for receiving information or any one of the above methods for sending information is performed.

Technical solutions provided by the specific implementations of the present application may include the following beneficial effects: first Downlink Control Information (DCI) is received, wherein the first DCI adopts a first DCI format, and the first DCI format includes a first information field for indicating a time unit for sending feedback information, and the first DCI is used for indicating a terminal device to send feedback information corresponding to at least one downlink channel, and an indication result of the first information field is an applicable value, and the at least one downlink channel includes a target downlink channel, which is irrelevant to the first DCI; wherein when the first DCI format is used for scheduling downlink channel transmission or indicating semi-static resource release, a value range of the indication result of the first information field includes an inapplicable value. Therefore it is ensured that an indication result of a first information field in first DCI is an applicable value, not indicating an applicable time domain resource for transmission of feedback information by a base station and occurrence of an unreasonable scheduling indication are limited. Further, system efficiency is improved, waste of power consumption caused by unnecessary processing by a terminal device is avoided, and the technical problems of low system efficiency and waste of power consumption of the terminal device are solved.

It should be understood that the above general description and the following detailed description are only exemplary and do not limit the present application.

BRIEF DESCRIPTION OF DRAWINGS

The accompanying drawings herein are incorporated in this specification, constitute a part of this specification, illustrate specific embodiments in accordance with the present application, and together with the specification serve to explain principles of the present application.

DETAILED DESCRIPTION

Exemplary embodiments will be described in detail herein, examples of which are shown in the accompanying drawings. When the following description relates to the drawings, unless otherwise stated, the same numbers in different drawings indicate the same or similar elements. Embodiments described in the following exemplary specific embodiments do not represent all embodiments consistent with specific embodiments of the present application. Rather, they are merely examples of methods and apparatuses consistent with some aspects of the present application as detailed in the appended claims. According to the specific embodiments of the present application, all other specific embodiments achieved by a person of ordinary skill in the art without making inventive efforts are within the protection scope of the present application.

Figure 1:
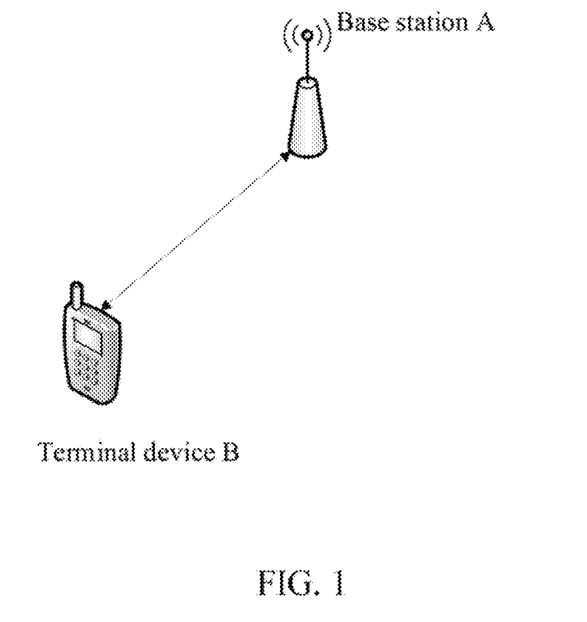
FIG. 1 is a diagram of a network architecture of a communication system to which a specific embodiment of the present application may be applied.

FIG. 1 is a system architecture of a communication system to which the following specific embodiments of the present application may be applied. The system architecture includes base station A and terminal device B.

An unlicensed spectrum is a spectrum that is classified by countries and regions and is available to communication of radio devices. The spectrum is generally regarded as a shared spectrum, that is, communication devices in different communication systems may use the spectrum as long as they meet the regulatory requirements configured by countries or regions on the spectrum, without applying for exclusive spectrum authority to the government. In order to enable various communication systems using unlicensed spectrum for wireless communication to coexist amicably on this spectrum, some countries or regions have stipulated the legal requirements that must be met for using unlicensed spectrum. For example, in some regions, a communication device follows a "Listen Before Talk (LBT)" principle, that is, before transmitting a signal on a channel of an unlicensed spectrum, the communication device needs to conduct channel listening first, and the communication device can transmit a signal only when a result of channel listening is that the channel is idle. If the result of channel listening by the communication device on the unlicensed spectrum channel is that the channel is busy, the communication device cannot transmit a signal. In order to ensure fairness, in one transmission, a duration in which a communication device uses a channel on the unlicensed spectrum for a signal transmission cannot exceed Maximum Channel Occupation Time (MCOT). With the development of wireless communication technology, both a Long Term Evolution (LTE) system and a New Radio (NR) system will consider network deployment on an unlicensed spectrum to perform data service transmission by using the unlicensed spectrum.

A Rel-16 (Release 16, i.e., 16th release) NR-U (NR-based access to Unlicensed Spectrum) supports multiple HARQ-ACK (Hybrid Automatic Repeat request-Acknowledgement) codebook generation modes, which include a Type-1 HARQ-ACK codebook, a Type-2 HARQ-ACK codebook, an Enhanced Type-2 HARQ-ACK codebook, and a Type-3 HARQ-ACK codebook, wherein Type-1 and Type-2 codebooks are two kinds of feedback information codebooks supported by NR Rel-15 (Release 15, i.e., 15th release), and the Enhanced Type-2 codebook and the Type-3 codebook are two kinds of feedback information codebooks newly introduced by the Rel-16 NR-U. The terminal device B determines a codebook used based on a high-layer signaling sent by a base station, wherein Type-1, Type-2, and Enhanced Type-2 codebooks are not configured at the same time, while the Type-3 codebook may be configured independently of Type-1, Type-2, and Enhanced Type-2 codebooks (i.e., may be configured in a superimposition way).

The Enhanced Type-2 HARQ-ACK codebook is an ACK/NACK feedback mode based on a downlink channel group, and at present indicates up to two downlink channel groups. The base station A indicates group information to which a PDSCH scheduled by Downlink control information (DCI) or a Physical Downlink Control Channel (PDCCH) carrying the DCI belongs through the DCI. When the base station A sends a trigger signaling to indicate the terminal device B to feed back ACK/NACK information corresponding to a group, the terminal device B feeds back feedback information corresponding to all PDSCHs or Physical Downlink Control Channels (PDCCHs) that belong to the group to the base station A. The base station A may trigger the terminal device B to send ACK/NACK information of a certain group for many times, that is, realize ACK/NACK retransmission. The 3GPP (3rd Generation Partnership Project) determines that DCI format 1_1 includes: a PDSCH group index information field for indicating group information to which a downlink channel corresponding to the DCI belongs; and a Number of requested PDSCH group(s) information field, which is used for indicating channel group information triggered by the DCI for feedback. A bit of "0" represents triggering to transmit feedback information of a channel group where a downlink channel corresponding to the current DCI is located, and a bit of "1" represents triggering to transmit feedback information of two channel groups. While DCI format 1_0 does not include channel group indication information for triggering.

The Type-3 HARQ-ACK codebook is a mode including ACK/NACK feedback corresponding to all HARQ processes. Specifically, the terminal device B supports up to N HARQ processes. When the base station A triggers the terminal device B to perform full process feedback, no matter how many HARQ processes the terminal device B actually receives, the terminal device B will always feedback ACK/NACK feedback information corresponding to N processes to the base station A. The ACK/NACK information may be mapped into a feedback information codebook in an order of indexes of HARQ processes. ACK/NACK information corresponding to an HARQ process not received is set as placeholder information (such as NACK). It is assumed that the terminal device B supports up to 8 HARQ processes, and one HARQ process is transmitted through one PDSCH at a time. The maximum quantity of transport blocks (TBs) supported by the terminal device B is 2 (that is, a PDSCH carries at most 2 TBs), and each TB corresponds to independent ACK/NACK feedback information. The terminal device B receives HARQ processes 3, 7, and 4. when the base station A triggers the terminal device B to perform full process feedback, the terminal device B transmits {NACKHARQ0,TB1, NACKHARQ0,TB1, NACKHARQ1,TB0, NACKHARQ1, TB1, NACKHARQ2, TB0, NACKHARQ2,TB1, bHARQ3,TB0,bHARQ3,TB1, bHARQ4,TB0, bHARQ4,TB1, NACKHARQ5,TB0, NACKHARQ5,TB1,NACKHARQ6,TB0, NACKHARQ6, TB1, bHARQ7,TB0, bHARQ7,TB1} in a PUCCH, wherein bHARQi,TBj represents ACK/NACK feedback information corresponding to TBj in HARQ process i. At present, it is determined that full process feedback may be triggered through DCI format 1_1, and the DCI may be used for scheduling at least one PDSCH transmission at the same time, or the DCI may not be used for scheduling any PDSCH transmission (that is, the DCI is only used for triggering full process feedback).

At present, it has been determined in 3GPP that for the Type-2 HARQ-ACK codebook and the Enhanced Type-2 HARQ-ACK codebook, in DCI format 1_1 of which, an inapplicable value may be included in an indication result set of a PDSCH-to-HARQ feedback timing indicator information field. And if the PDSCH-to-HARQ feedback timing indicator information field in the current DCI format 1_1 indicates a non-inapplicable value, the terminal device B determines a time slot or sub-time slot for transmitting ACK/NACK information according to the indication. If the PDSCH-to-HARQ feedback timing indicator in the current DCI format 1_1 indicates an inapplicable value, it means that ACK/NACK information corresponding to a PDSCH scheduled by the DCI or a PDCCH carrying the DCI will not be fed back temporarily.

To sum up, for the Enhanced Type-2 HARQ-ACK codebook, DCI format 1_1 triggers transmission of feedback information of all downlink channels in two channel groups while scheduling one downlink channel, or for the Type-3 HARQ-ACK codebook, DCI format 1_1 triggers transmission of feedback information of all HARQ processes, which means that base station A expects terminal device B to send ACK/NACK information corresponding to all scheduled PDSCHs to base station A. However, if the PDSCH-to-HARQ feedback timing indicator in the DCI indicates an inapplicable value, it means that the base station A does not indicate an applicable time domain resource for transmission of feedback information. This indication result itself is unreasonable and contradictory. Therefore, there are technical problems of low system efficiency and waste of power consumption of a terminal device.

The following specific embodiments of the present application will describe in detail how to ensure that an indication result of a first information field in a first DCI is an applicable value, thus solving the technical problems of low system efficiency and waste of power consumption of the terminal device.

In the system architecture, the exemplary communication system may be a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of an NR system, an LTE-based access to unlicensed spectrum (LTE-U) system, a New Radio based access to unlicensed spectrum (NR-U) system, a Universal Mobile Telecommunication System (UMTS), a Worldwide Interoperability for Microwave Access (WiMAX) communication system, Wireless Local Area Networks (WLAN), Wireless Fidelity (WiFi), a next generation communication system, or other communication systems.

The exemplary communication system specifically includes a network device and a terminal. When the terminal accesses a mobile communication network provided by the network device, the terminal and the network device may be connected for communication through a wireless link, and a mode of the communication connection may be a single connection mode, a double connection mode, or a multiple connection mode. However, when the mode of communication connection is the single connection mode, the network device may be a LTE base station or an NR base station (also called a gNB base station), and when the mode of communication connection is the double connection mode (specifically, it may be implemented through a Carrier Aggregation (CA) technology or multiple network devices). A terminal related in specific embodiments of the present application may include various devices (such as handheld devices, vehicle-mounted devices, wearable devices, computing devices) with wireless connection functions, or other processing devices connected to wireless modems, and various forms of User Equipment (UEs), Mobile Stations (MSs), terminal devices, and the like. For convenience of description, the above-mentioned devices are collectively referred to as terminal devices.

In addition, the terms "system" and "network" are often used interchangeably herein. The term "and/or" herein describes an association relation between associated objects only, indicating that there may be three relations, for example, A and/or B may indicate three cases: A alone, both A and B, and B alone. In addition, the symbol "/" herein generally indicates that there is a "or" relationship between the associated objects before and after "/".

It should be understood that in the specific embodiments of the present application, "B corresponding to A" indicates that B is associated with A, and B may be determined according to A. However, it should be further understood that determining B according to A does not mean that B is determined according to A only, and B may be determined according to A and/or other information.

Figure 2:
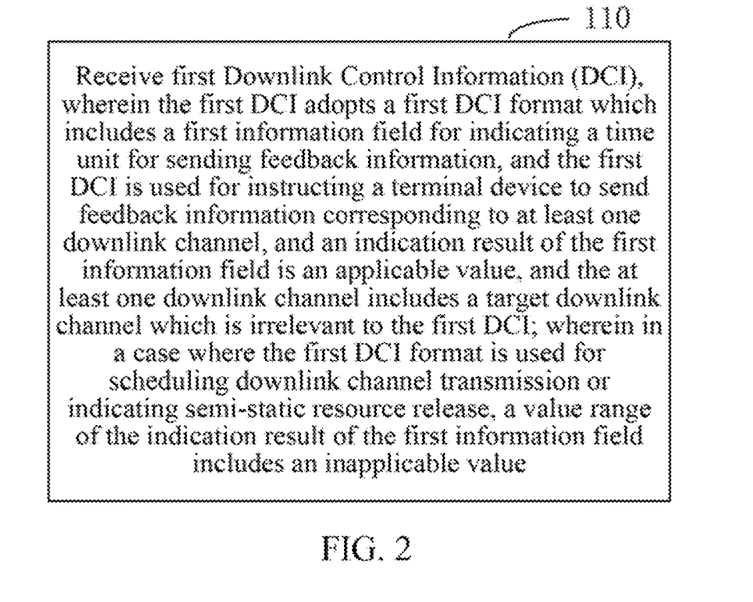
FIG. 2 is a flowchart of a method for receiving information of specific embodiment one of the present application.

FIG. 2 is a flowchart of a method for receiving information of specific embodiment one of the present application. As shown in FIG. 2, the method for receiving information is applied to a terminal device, and may include the following acts.

In act 110, first Downlink Control Information (DCI) is received, wherein the first DCI adopts a first DCI format, which includes a first information field for indicating a time unit for sending feedback information, and the first DCI is used for indicating a terminal device to send feedback information corresponding to at least one downlink channel, and an indication result of the first information field is an applicable value, and the at least one downlink channel includes a target downlink channel, which is irrelevant to the first DCI. When the first DCI format is used for scheduling downlink channel transmission or indicating semi-static resource release, a value range of the indication result of the first information field includes an inapplicable value.

The terminal device receives first Downlink Control Information (DCI), which adopts the first DCI format. In at least one implementation, the first DCI format may be DCI 1_1, the first DCI format includes a first information field, which may be a PDSCH-to-HARQ feedback timing indicator information field. The first DCI is used for indicating the terminal device to send feedback information corresponding to at least one downlink channel, and the feedback information may be ACK/NACK. An indication result of the first information field is an applicable value. At least one downlink channel includes a target downlink channel, which is irrelevant to the first DCI. It is to restrict the indication result to be an inapplicable value, that is, limit unreasonable scheduling indication. When the first DCI format is used for scheduling downlink channel transmission or indicating semi-static resource release, a value range of the indication result of the first information field includes an inapplicable value.

In at least one implementation, the target downlink channel is a downlink channel carrying a second DCI or a downlink channel scheduled by a second DCI; and/or, the target downlink channel does not belong to a first channel group, and a downlink channel carrying the first DCI or a downlink channel scheduled by the first DCI belongs to the first channel group; and/or, an index of an HARQ process carried by the target downlink channel is different from that of an HARQ process scheduled by the first DCI.

The target downlink channel includes at least one of the following conditions.

The target downlink channel is a downlink channel carrying a second DCI or a downlink channel scheduled by second DCI, in at least one implementation, in this condition, the first DCI may not correspond to scheduling of downlink channel transmission or the first DCI may not be used for indicating Semi-Persistent Scheduling (SPS) resource release (that is, the first DCI itself has no corresponding ACK/NACK information, or the first DCI is only used for triggering the terminal device to report and send feedback information corresponding to other downlink channels).

And/Or, the target downlink channel does not belong to a first channel group, and a downlink channel carrying the first DCI or a downlink channel scheduled by the first DCI belongs to the first channel group, that is, an indication result of a PDSCH group index information field in the first DCI is the first channel group, and the target downlink channel does not belong to the first channel group.

And/or, an index of an HARQ process carried by the target downlink channel is different from that of an HARQ process scheduled by the first DCI.

When the target downlink channel includes at least one of the above conditions, it means that the target downlink channel is irrelevant to the first DCI.

In at least one implementation, that the indication result of the first information field is an applicable value includes at least one of the following conditions: the first information field in the first DCI format corresponds to a candidate set, which includes an inapplicable value, and the indication result of the first information field in the first DCI cannot be an inapplicable value; and the candidate set corresponding to the first information field in the first DCI does not include an inapplicable value.

In at least one implementation, that the candidate set corresponding to the first information field in the first DCI does not include an inapplicable value includes at least one of the following conditions: a first information field in the first DCI format corresponds to at least a first candidate set and a second candidate set, the first information field in the first DCI corresponds to the second candidate set, wherein the first candidate set includes an inapplicable value and the second candidate set does not include an inapplicable value; and a first information field in the first DCI format corresponds to a candidate set, which includes an inapplicable value, when an indication result of the first information field in the first DCI is an inapplicable value in the candidate set, the inapplicable value is replaced by another predetermined applicable value.

That the indication result of the first information field is an applicable value includes at least one of the following conditions: a first information field in the first DCI format corresponds to a candidate set, which includes an inapplicable value, and an indication result of the first information field in the first DCI cannot be an inapplicable value; in this condition, i.e., the terminal device does not expect the indication result of the first information field at this time to be an inapplicable value, the first information field in the first DCI format corresponds to a candidate set K1 (the candidate set K1 includes up to 8 values, which is pre-configured through a high-layer signaling), which includes an inapplicable value, and a base station cannot indicate in the first DCI that the first information field takes an inapplicable value in the candidate set K1; or, the candidate set corresponding to the first information field in the first DCI does not include an inapplicable value.

That the candidate set corresponding to the first information field in the first DCI does not include an inapplicable value includes at least one of the following conditions at this time: the first information field in the first DCI format corresponds to at least a first candidate set and a second candidate set, the first information field in the first DCI corresponds to the second candidate set, wherein the first candidate set includes an inapplicable value and the second candidate set does not include an inapplicable value; wherein it is configured through a high-layer signaling that the first information field in the first DCI format corresponds to at least two candidate sets: a first candidate set K1 and a second candidate set K1, wherein the first candidate set K1 includes an inapplicable value and the second candidate set K1 does not include an inapplicable value, and the first information field in the first DCI corresponds to the second candidate set, and an applicable value is obtained from the second candidate set K1; or, a first information field in the first DCI format corresponds to a candidate set, which includes an inapplicable value, when an indication result of the first information field in the first DCI is an inapplicable value in the candidate set, the inapplicable value is replaced by another predetermined applicable value; wherein it is configured through a high-layer signaling that the first information field in the first DCI format corresponds to a candidate set K1, which includes an inapplicable value, when the first information field in the first DCI indicates an inapplicable value, the inapplicable value is replaced by another predetermined applicable value, which may be obtained by a network configuration or protocol agreement, as shown in Table 1.

TABLE 1

| Indication result of a feedback timing indicator | Value in candidate set K1 | Predetermined applicable value |
|---|---|---|
| 00 | Inapplicable value | 8 |
| 01 | 6 | |
| 10 | 4 | |
| 11 | 2 | |

In Table 1, when an indication result of the first information field is 00, a value in the candidate set K1 is an inapplicable value, and a predetermined applicable value is 8 according to a network configuration or protocol regulation. When the indication result of the first information field is 00, the inapplicable value is replaced by the predetermined applicable value 8, so that the indication result of the first information field is an applicable value.

In at least one implementation, the first DCI format includes one of the following formats: DCI format 1_1, DCI format 0_1, DCI format 1_2, and DCI format 0_2.

In at least one implementation, at least two channel groups include a downlink channel, and each of at least two channel groups includes at least one downlink channel, and downlink channels included in different channel groups are different; or, at least one downlink channel includes N downlink channels, wherein N is a maximum quantity of HARQ processes configured by a terminal; or, an HARQ process carried in each downlink channel included in the at least one downlink channel is different from each other.

In at least one implementation, a terminal device is configured to support a Type-2 HARQ-ACK codebook and a Type-3 HARQ-ACK codebook, or an enhanced Type-2 HARQ-ACK codebook and a Type-3 HARQ-ACK codebook. When a first DCI format is 1_1 and a first information field is a PDSCH-to-HARQ feedback timing indicator information field, the terminal device receives the first DCI, of which the format is 1_1, and if in the first DCI, when an One-shot HARQ-ACK request information field indicates that the terminal device sends the type-3 HARQ-ACK codebook, an indication result of the PDSCH-to-HARQ feedback timing indicator information field in the first DCI must be an applicable value, or the terminal device does not expect the PDSCH-to-HARQ feedback timing indicator indicates to be an inapplicable value at this time.

In at least one implementation, the terminal device is configured with an enhanced Type-2 HARQ-ACK codebook, and the terminal device supports up to two PDSCH groups. When the first DCI format is 1_1 and the first information field is a PDSCH-to-HARQ feedback timing indicator information field, the terminal device receives the first DCI, of which the format is 1_1. An indication result of a PDSCH group index information field in the first DCI is group 1 (that is, a downlink channel scheduled by the first DCI or a downlink channel carrying the first DCI belongs to group 1), an indication result of the Number of requested PDSCH group(s) information field in the first DCI is to feed back ACK/NACK information of two PDSCH groups (Physical Downlink Shared Channel groups) (that is, to trigger the terminal device to feed back ACK/NACK information corresponding to downlink channels in group 1 and group 2). The indication result of the PDSCH-to-HARQ feedback timing indicator information field in the first DCI must be an applicable value, or the terminal device does not expect the PDSCH-to-HARQ feedback timing indicator indicates to be an inapplicable value at this time.

In the embodiment one, first Downlink Control Information (DCI) is received, the first DCI adopts a first DCI format, and the first DCI format includes a first information field for indicating a time unit for sending feedback information, and the first DCI is used for indicating a terminal device to send feedback information corresponding to at least one downlink channel, and an indication result of the first information field is an applicable value, and the at least one downlink channel includes a target downlink channel, which is irrelevant to the first DCI; wherein when the first DCI format is used for scheduling downlink channel transmission or indicating semi-static resource release, a value range of the indication result of the first information field includes an inapplicable value. Therefore, it is ensured that the indication result of the first information field in first DCI is an applicable value, not indicating an applicable time domain resource for transmission of feedback information by a base station and occurrence of an unreasonable scheduling indication are limited. Further, system efficiency is improved, waste of power consumption caused by unnecessary processing performed by a terminal device is avoided, and the technical problems of low system efficiency and waste of power consumption of the terminal device are solved.

Figure 3:
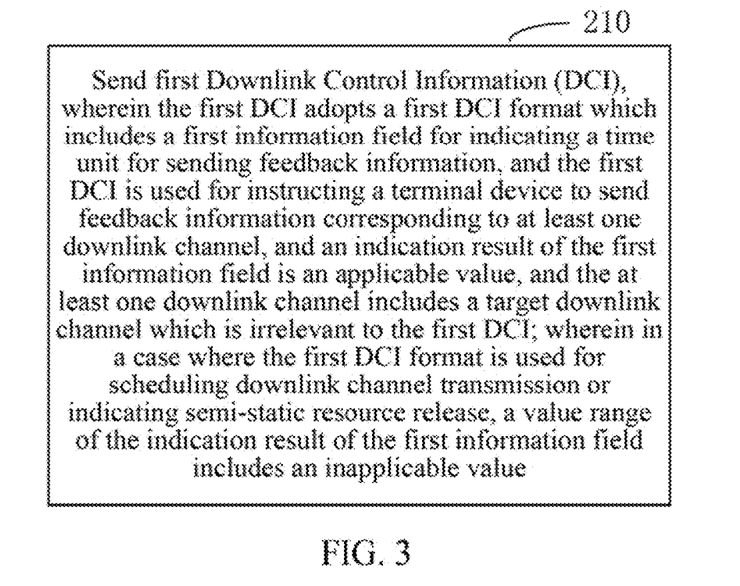
FIG. 3 is a flowchart of a method for sending information of specific embodiment two of the present application.

FIG. 3 is a flowchart of a method for sending information of specific embodiment two of the present application. As shown in FIG. 3, the method for sending information is applied to a network device, and may include the following acts.

In act 210, first Downlink Control Information (DCI) is sent, wherein the first DCI adopts a first DCI format, which includes a first information field for indicating a time unit for sending feedback information, and the first DCI is used for indicating a terminal device to send feedback information corresponding to at least one downlink channel, and an indication result of the first information field is an applicable value, and the at least one downlink channel includes a target downlink channel, which is irrelevant to the first DCI; wherein when the first DCI format is used for scheduling downlink channel transmission or indicating semi-static resource release, a value range of the indication result of the first information field includes an inapplicable value.

In at least one implementation, the target downlink channel is a downlink channel carrying a second DCI or a downlink channel scheduled by a second DCI; and/or, the target downlink channel does not belong to a first channel group, and a downlink channel carrying the first DCI or a downlink channel scheduled by the first DCI belongs to the first channel group; or, an index of an HARQ process carried by the target downlink channel is different from that of an HARQ process scheduled by the first DCI.

In at least one implementation, that the indication result of the first information field is an applicable value includes at least one of the following conditions: the first information field in the first DCI format corresponds to a candidate set, which includes an inapplicable value, and the indication result of the first information field in the first DCI cannot be an inapplicable value; and the candidate set corresponding to the first information field in the first DCI does not include an inapplicable value.

In at least one implementation, that the candidate set corresponding to the first information field in the first DCI does not include an inapplicable value includes at least one of the following conditions: the first information field in the first DCI format corresponds to at least a first candidate set and a second candidate set, the first information field in the first DCI corresponds to the second candidate set, wherein the first candidate set includes an inapplicable value and the second candidate set does not include an inapplicable value; and the first information field in the first DCI format corresponds to a candidate set, which includes an inapplicable value, when an indication result of the first information field in the first DCI is an inapplicable value in the candidate set, the inapplicable value is replaced by another predetermined applicable value.

In at least one implementation, the first DCI format includes one of the following formats: DCI format 1_1, DCI format 0_1, DCI format 1_2, and DCI format 0_2.

In at least one implementation, at least two channel groups include a downlink channel, and each of at least two channel groups includes at least one downlink channel, and downlink channels included in different channel groups are different; or, at least one downlink channel includes N downlink channels, wherein N is a maximum quantity of HARQ processes configured by a terminal device; or, an HARQ process carried in each downlink channel included in the at least one downlink channel is different from each other.

The implementation process of the method for sending information may refer to the implementation process of the corresponding acts in any of the methods for receiving information provided in above specific embodiment one, which will not be repeated here.

Figure 4:
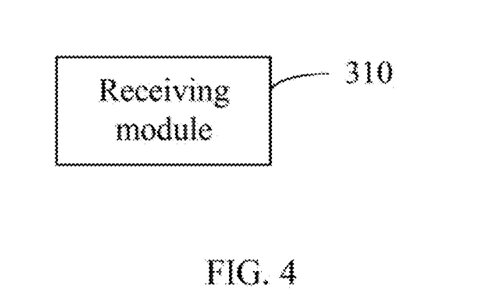
FIG. 4 is a block diagram of an apparatus for receiving information provided in embodiment three of the present application.

FIG. 4 is a block diagram of an apparatus for receiving information provided in embodiment three of the present application. As shown in FIG. 4, the apparatus is a terminal device, which may include but is not limited to a receiving module 310.

The receiving module 310 is configured to receive first Downlink Control Information (DCI), wherein the first DCI adopts a first DCI format which includes a first information field for indicating a time unit for sending feedback information, and the first DCI is used for indicating a terminal device to send feedback information corresponding to at least one downlink channel, and an indication result of the first information field is an applicable value, and the at least one downlink channel includes a target downlink channel which is irrelevant to the first DCI; wherein when the first DCI format is used for scheduling downlink channel transmission or indicating semi-static resource release, a value range of the indication result of the first information field includes an inapplicable value.

In at least one implementation, the target downlink channel is a downlink channel carrying a second DCI or a downlink channel scheduled by a second DCI; and/or, the target downlink channel does not belong to a first channel group, and a downlink channel carrying the first DCI or a downlink channel scheduled by the first DCI belongs to the first channel group; and/or, an index of an HARQ process carried by the target downlink channel is different from that of an HARQ process scheduled by the first DCI.

In at least one implementation, that the indication result of the first information field is an applicable value includes at least one of the following conditions: a first information field in the first DCI format corresponds to a candidate set, which includes an inapplicable value, and the indication result of the first information field in the first DCI cannot be an inapplicable value; and a candidate set corresponding to the first information field in the first DCI does not include an inapplicable value.

In at least one implementation, that the candidate set corresponding to the first information field in the first DCI does not include an inapplicable value includes at least one of the following conditions: the first information field in the first DCI format corresponds to at least a first candidate set and a second candidate set, the first information field in the first DCI corresponds to the second candidate set, wherein the first candidate set includes an inapplicable value, and the second candidate set does not include an inapplicable value; and the first information field in the first DCI format corresponds to a candidate set, which includes an inapplicable value, when an indication result of a first information field in the first DCI is an inapplicable value in the candidate set, the inapplicable value is replaced by another predetermined applicable value.

In at least one implementation, the first DCI format includes one of the following formats: DCI format 1_1, DCI format 0_1, DCI format 1_2, and DCI format 0_2.

In at least one implementation, at least two channel groups include a downlink channel, and each of at least two channel groups includes at least one downlink channel, and downlink channels included in different channel groups are different; or, at least one downlink channel includes N downlink channels, wherein N is a maximum quantity of HARQ processes configured by a terminal device; or, an HARQ process carried in each downlink channel included in the at least one downlink channel is different from each other.

The implementation process of the functions and roles of various modules and other parts that have not been described or defined in detail in this embodiment may refer to description in the above embodiment one, and will not be repeated here.

Figure 5:
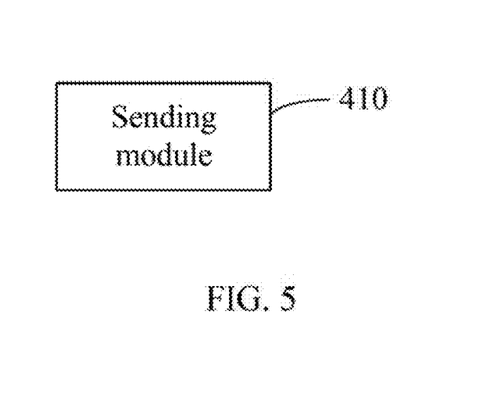
FIG. 5 is a block diagram of an apparatus for sending information provided in embodiment four of the present application.

FIG. 5 is a block diagram of an apparatus for sending information provided in embodiment four of the present application. As shown in FIG. 5, the apparatus is a network device, which may include but is not limited to a sending module 410.

The sending module 410 is configured to send first Downlink Control Information (DCI), wherein the first DCI adopts a first DCI format which includes a first information field for indicating a time unit for sending feedback information, and the first DCI is used for indicating a terminal device to send feedback information corresponding to at least one downlink channel, and an indication result of the first information field is an applicable value, and the at least one downlink channel includes a target downlink channel which is irrelevant to the first DCI; wherein when the first DCI format is used for scheduling downlink channel transmission or indicating semi-static resource release, a value range of the indication result of the first information field includes an inapplicable value.

In at least one implementation, the target downlink channel is a downlink channel carrying a second DCI or a downlink channel scheduled by a second DCI; and/or, the target downlink channel does not belong to a first channel group, and a downlink channel carrying the first DCI or a downlink channel scheduled by the first DCI belongs to the first channel group; and/or, an index of an HARQ process carried by the target downlink channel is different from that of an HARQ process scheduled by the first DCI.

In at least one implementation, that the indication result of the first information field is an applicable value includes at least one of the following conditions: the first information field in the first DCI format corresponds to a candidate set, which includes an inapplicable value, and the indication result of the first information field in the first DCI cannot be an inapplicable value; and the candidate set corresponding to the first information field in the first DCI does not include an inapplicable value.

In at least one implementation, that the candidate set corresponding to the first information field in the first DCI does not include an inapplicable value includes at least one of the following conditions: the first information field in the first DCI format corresponds to at least a first candidate set and a second candidate set, the first information field in the first DCI corresponds to the second candidate set, wherein the first candidate set includes an inapplicable value and the second candidate set does not include an inapplicable value; and the first information field in the first DCI format corresponds to a candidate set, which includes an inapplicable value, when an indication result of a first information field in the first DCI is an inapplicable value in the candidate set, the inapplicable value is replaced by another predetermined applicable value.

In at least one implementation, the first DCI format includes one of the following formats: DCI format 1_1, DCI format 0_1, DCI format 1_2, and DCI format 0_2.

In at least one implementation, at least two channel groups include a downlink channel, and each of at least two channel groups includes at least one downlink channel, and downlink channels included in different channel groups are different; or, at least one downlink channel includes N downlink channels, wherein N is a maximum quantity of HARQ processes configured by a terminal device; or, an HARQ process carried in each downlink channel included in the at least one downlink channel is different from each other.

The implementation process of the functions and roles of various modules and other parts that have not been described or defined in detail in this embodiment may refer to description in the above embodiments one and two, and will not be repeated here.

Figure 6:
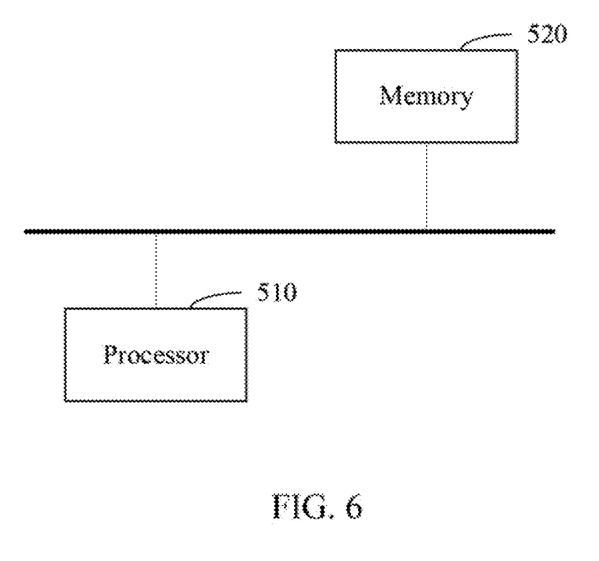
FIG. 6 is a schematic diagram of a hardware structure of an apparatus for receiving information and/or an apparatus for sending information provided in embodiment five of the present application.

FIG. 6 is a schematic diagram of a hardware structure of an apparatus for receiving information and/or an apparatus for sending information provided in embodiment five of the present application. As shown in FIG. 6, the apparatus includes a processor 510 and a memory 520, and the various components of the apparatus are connected with each other for communication through a bus system. The apparatus shown in FIG. 6 may be provided in the above terminal device or network device.

The memory 520 stores a program that may be run on the processor 510. When the processor 510 executes the program, part or all of the acts of the method for receiving information in the method specific embodiment one are performed.

The processor 510 may be an independent component or a collective name of multiple processing elements. For example, the processor 610 may be a CPU, an ASIC, or one or more integrated circuits configured to implement the above method, such as at least one microprocessor DSP, or at least one FPGA.

A specific embodiment of the present application further provides a computer readable storage medium. The computer readable storage medium stores a computer program, wherein the computer program is executed, part or all of the acts of the method for receiving information or the method for sending information in the above method specific embodiments are performed.

A specific embodiment of the present application further provides a computer program product, wherein the computer program product is stored in a non-transitory computer readable storage medium, and when the computer program is executed, part or all of the acts of the method for receiving information or the method for sending information in the above method specific embodiments are performed. The computer program product may be a software installation package.

A specific embodiment of the present application further provides a chip, which includes a processor for calling and running a computer program from a memory, and a device installed with the chip performs part or all of the acts of the method for receiving information or the method for sending information in the above method specific embodiments.

A specific embodiment of the present application further provides a computer program, which when executed, part or all of the acts of the method for receiving information or the method for sending information in the above method specific embodiments are performed.

The acts of the methods or algorithms described in the specific embodiments of the present application may be implemented in hardware or may be implemented by a processor executing software instructions. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form wellknown in the art. An exemplary storage medium is coupled to the processor such that the processor can read information from the storage medium, and write information to the storage medium. Of course, the storage medium may be a component of the processor. The processor and the storage medium may be located in an ASIC. In addition, the ASIC may be located in an access network device, a target network device, or a core network device. Or, the processor and the storage medium may act as separate components in the access network device, the target network device, or the core network device.

Those skilled in the art should realize that in one or more examples described above, the functions described in the specific embodiments of the present application may be implemented in whole or in parts through software, hardware, firmware, or any combination thereof. When the functions described in the embodiments of the present application are implemented through software, these functions may be implemented in whole or in parts in the form of a computer program product. The computer program product includes one or more computer instructions. When the computer program instructions are loaded and executed on a computer, the flows or functions according to the specific embodiments of the present application are generated in whole or in parts. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that the computer may access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The specific embodiments described above describe purposes, technical solutions and beneficial effects of the specific embodiments of the present application in further detail. It should be understood that the above are only specific implementation modes of specific embodiments of the present application, and are not used to limit the protection scope of specific embodiments of the present application. Any modification, equivalent substitution, improvement and the like, made on the basis of technical solutions of specific embodiments of the present application shall be included in the protection scope of specific embodiments of the present application.

It should be understood that the present application is not limited to specific structures already described above and shown in the drawings, and that various modifications and changes may be made without departing from its scope. The scope of the present application is limited only by the appended claims.

What is claimed is:

1. A method for receiving information, applied to a terminal device, comprising:
receiving first Downlink Control Information (DCI), wherein the first DCI adopts a first DCI format, the first DCI is used for indicating the terminal device to send feedback information corresponding to at least one downlink channel, wherein the first DCI format comprises a first information field for indicating a time unit for sending feedback information, and an indication result of the first information field is an applicable value, and the at least one downlink channel comprises a target downlink channel, wherein an index of a Hybrid Automatic Repeat request (HARQ) process carried by the target downlink channel is different from that of an HARQ process scheduled by the first DCI;
wherein in response to the first DCI used for scheduling downlink channel transmission or indicating semi-persistent scheduling (SPS) resource release, a value range of the indication result of the first information field comprises an inapplicable value; and
transmitting HARQ feedback information according to the first DCI in response to the indication result of the first information field which is the applicable value.

2. The method of claim 1, wherein that the indication result of the first information field is an applicable value comprises the following condition:
the first information field in the first DCI format corresponds to a candidate set which comprises an inapplicable value, and the indication result of the first information field in the first DCI cannot be the inapplicable value.

3. The method of claim 1, wherein the first DCI format comprises DCI format 1_1.

4. The method of claim 1, wherein
the at least one downlink channel comprises N downlink channels, wherein N is a maximum quantity of Hybrid Automatic Repeat request (HARQ) processes configured by the terminal device; or,
an HARQ process carried in each of the at least one downlink channel is different from each other.

5. A method for sending information, applied to a network device, comprising:
sending first Downlink Control Information (DCI), wherein the first DCI adopts a first DCI format, the first DCI is used for indicating a terminal device to send feedback information corresponding to at least one downlink channel, wherein the first DCI format comprises a first information field for indicating a time unit for sending feedback information, and an indication result of the first information field is an applicable value, and the at least one downlink channel comprises a target downlink channel, wherein an index of a Hybrid Automatic Repeat request (HARQ) process carried by the target downlink channel is different from that of an HARQ process scheduled by the first DCI;
wherein in response to the first DCI used for scheduling downlink channel transmission or indicating semi-persistent scheduling (SPS) resource release, a value range of the indication result of the first information field comprises an inapplicable value; and
receiving HARQ feedback information according to the first DCI in response to the indication result of the first information field which is the applicable value.

6. The method of claim 5, wherein that the indication result of the first information field is an applicable value comprises the following condition:
the first information field in the first DCI format corresponds to a candidate set which comprises an inapplicable value, and the indication result of the first information field in the first DCI cannot be the inapplicable value.

7. The method of claim 5, wherein the first DCI format comprises DCI format 1_1.

8. The method of claim 5, wherein
the at least one downlink channel comprises N downlink channels, wherein N is a maximum quantity of Hybrid Automatic Repeat request (HARQ) processes configured by the terminal device; or,
an HARQ process carried in each of the at least one downlink channel is different from each other.

9. An apparatus for receiving information, applied to a terminal device, comprising:
a receiver, configured to receive first Downlink Control Information (DCI), wherein the first DCI adopts a first DCI format, the first DCI is used for indicating the terminal device to send feedback information corresponding to at least one downlink channel, wherein the first DCI format comprises a first information field for indicating a time unit for sending feedback information, and an indication result of the first information field is an applicable value, and the at least one downlink channel comprises a target downlink channel, wherein an index of a Hybrid Automatic Repeat request (HARQ) process carried by the target downlink channel is different from that of an HARQ process scheduled by the first DCI;
wherein in response to the first DCI used for scheduling downlink channel transmission or indicating semi-persistent scheduling (SPS) resource release, a value range of the indication result of the first information field comprises an inapplicable value; and
transmitting HARQ feedback information according to the first DCI in response to the indication result of the first information field which is the applicable value.

10. The apparatus of claim 9, wherein that the indication result of the first information field is an applicable value comprises the following condition:
the first information field in the first DCI format corresponds to a candidate set which comprises an inapplicable value, and the indication result of the first information field in the first DCI cannot be the inapplicable value.

11. The apparatus of claim 9, wherein the first DCI format comprises DCI format 1_1.

12. The apparatus of claim 9, wherein
the at least one downlink channel comprises N downlink channels, wherein N is a maximum quantity of Hybrid Automatic Repeat request (HARQ) processes configured by the terminal device; or,
an HARQ process carried in downlink channels comprised in the at least one downlink channel is different from each other.

* * * * *